Jan. 29, 1963 J. R. SUCHER 3,075,249
PROCESS FOR COMPRESSION MOLDING EMBOSSED ARTICLES
Filed Sept. 6, 1960

INVENTOR
Joseph R. Sucher
BY
J.F. Basseches
his ATTORNEY

United States Patent Office 3,075,249
Patented Jan. 29, 1963

3,075,249
PROCESS FOR COMPRESSION MOLDING EMBOSSED ARTICLES
Joseph R. Sucher, Woodmere, N.Y., assignor to Emsig Manufacturing Co., New York, N.Y., a partnership
Filed Sept. 6, 1960, Ser. No. 54,093
5 Claims. (Cl. 18—55)

This invention relates to a method for making a compression molded product, and more particularly to buttons, and still more particularly to molded thermoset products carrying a surface embossed design.

This application is a continuation-in-part of my application Serial No. 809,994, filed April 30, 1959, now abandoned, entitled Compression Molded Embossed Buttons or Other Molded Objects.

Known to me is the manufacture of ornamental molded articles wherein thermosetting plastics are shaped under heat and pressure. Commercial operation for the production of such products entails costly molding apparatus, molds or dies, the investment for which is substantial, particularly for the simultaneous molding of a large number of small ornamental objects, such as buttons, where multiple cavity dies are employed. The alteration of such dies further to supply a variety of surface ornamentations of intricately embossed outline has resulted in shapes of limited outline, as it is economical only for long runs to make the change, not to speak of the additional cost of making an intricate design in preparing such dies.

Styling of plastic articles, particularly buttons, especially with durable thermosetting plastics, has therefore been limited by reason of the unusual expense in the cost of dies, particularly of dies in which embossed or engraved impressions are to be effected.

I have discovered a method for compression molding of plastic products, particularly molded buttons, in a multiple cavity die wherein smooth surface molds may be utilized for molding products with an impressed design whereby highly ornamental surface impressions of embossed effect, including toning of the shadows by colors, may be supplied economically, particularly on short run molding operations, thereby avoiding the great expense of engraved or impressed die sinking.

Still more particularly, it is an object of this invention to provide a mold for molding thermosetting plastics and to impart carved, impressed, embossed, engraved surface effects of durable and intricate nature, particularly with multiple cavity dies of smooth outline, whereby short run molding operations normally requiring costly and intricate dies may be effected as economically as the overall long run molding operations.

My invention is predicated upon my discovery that thermosetting plastic compositions may be impressed, embossed and shadow toned with a strippable embossing element and cured to the irreversible plastic form in molds having smooth faced die cavities, provided initial intermediate curing has progressed to the fully formed polymerization stage and the charge has flowed to the full capacity of the mold cavities.

Accordingly, by my invention, a method of decorating the surface of plastic products may be practiced, using smooth surfaced molds and a strippable component of low cost to make impressions and alternatively to shadow tone the same on short runs and thereupon curing the charge of thermosetting materials to the irreversible condition of plasticity, whereby durability is effected in a manner heretofore deemed possible only with costly compression molded dies of smooth outline.

In accordance with my invention, compression molding charges of resinous products of synthetic condensation products which have thermosetting properties are provided in the form of mold charges, such as pills or pellets.

Of the synthetic condensation products which may be employed, I enumerate:

The aminoplasts, such as urea formaldehyde resins, melamine formaldehyde resins, aniline formaldehyde resin;

The phenoplasts, such as phenol formaldehyde resinous condensation products;

Polyesters, including alkyd resins and unsaturated polyester thermosetting resins.

Such products are initially prepared in the form of powder or of pellets or pills of molding powder of such resinous products, compressed into simple shapes, after blending, where desired, with fillers and dyes in a known manner and capable of being molded under heat and pressure from the potentially reactive stage to the thermally infusible stage.

By my invention, as an object thereof, it is intended to impress upon the finished surfaces of articles, such as buttons, embossed outlines representing a great many open particulated designs, such as fabric weaves, especially where the articles, such as buttons, are to be matched in surface design to some garment made of similar fabric.

An exemplified form of such weave is shown in the appended drawings wherein—

In accordance with my invention, thermosetting synthetic resinous condensation products which may be cured under heat and pressure to the infusible stage are employed and the invention is illustrated in connection with the making of buttons employing multicavity molds of the order of those which may make from 13 to 50 ligne buttons, in number of from about two to three gross in one molding operation. Sew-through buttons or particularly shank buttons are contemplated in which a self-shank or integral shank is molded in one operation. The mold cavities as contemplated by me for a multiple cavity mold are of the general character exemplified in my Patent No. 2,652,597, September 22, 1953, in which the mold cavity dies outline a shank button of the general outline illustrated in the patent to Troll No. 2,597,912 of May 27, 1952.

The multiple cavity compression molds for carrying out the molding operations are semi-hydraulically actuated, with a capacity of about 3000 pounds per square inch, with heating facilities in excess of 500° F. A press known as the Standard Mystic Press may be employed, provided with knock out pins for discharge of the molded material in each cavity.

Molding operations with presses having multiple cavities for making buttons as described, in quantities from two to three gross per operation, are very expensive and uneconomical unless large runs are staged. In the interests of economy, by reason of the number of cavities in the mold, die sinking of the mold cavities is more usually devoted to smooth faced outlines and, therefore, embossed, carved and etched designs are usually not effected in multi-cavity molds as described, unless long runs to justify the cost are assured, to set off the production against the cost of the dies.

According to my invention, I may utilize multiple cavity molds having smooth faced or simple shaped outlines to make compression molded articles from thermosetting molding powder charges, and to effect an embossed or intricate surface impression design thereon, and secure fully cured, thermoset products without the expense of engraving the mold cavities. Such operation may be effected for relatively short runs with economy by curing the thermosetting molding powder charge to a stage below full cure, but to the point where spilling no longer can occur as a result of continued heat and pressure operation in the mold. While retaining the heat of such initial curing, and retaining the ability to be deformed at high pressures, the surface of the charge is impressed with the particulated design of a strippable material to achieve an embossed or impressed design, the curing being then carried out to the final, irreversible stage as to plasticity, and while the molded charge retains the residual heat, without deforming the impression so applied, the strippable material is removed and the batch discharged from the cavities.

Figure 1:
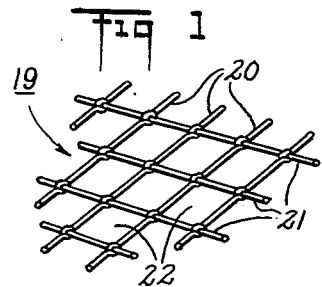
FIGURE 1 illustrates an open weave fabric, the design of which is to be duplicated.
Figure 1A:
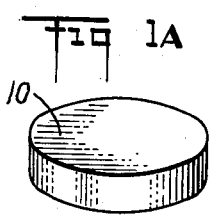
FIGURE 1a is a perspective view of a compression molded pellet forming the starting material in accordance with my invention.

As an example of making a low cost compression molded, surface-impressed-design button from a smooth surfaced, multiple cavity mold which may outline the button shape, I refer to the drawings wherein FIGURE 1a shows the initial charge, which consists of a pill or pellet made from molding powder. The molding powder which may be exemplified is a thermosetting batch of melamine formaldehyde resin duly mixed with filler and coloring dyes of known composition, and which may be cured to the infusible, irreversible stage at a temperature from 310 to 350° F., at about 3000 pounds per square inch, in about 40 seconds.

The pellet 10 is charged into the one cavity of a multiple cavity mold which has been illustrated, and consists of an upper cavity section 11 and a registering lower cavity section 12. The mold cavity section 12 has a cavity 13 of a form to outline a shank button with a body portion 14 and an integral shank 15, the surface 16 whereof is adjacent the flash or parting line 17. The exposed decorative face of the shank button is outlined by the smooth faced cavity 18 of the upper mold section 11 of simple contour, and the shank or back of the button forming cavity 13 in each case.

In a multiple cavity mold of the character described, an initial charge of two to three gross of pellets is distributed into a corresponding number of cavities, whereupon the mold is closed while being heated to a temperature from 310 to 350° F., at which temperature and under a pressure of 3000 pounds per square inch, the resinous material achieves a plasticity to follow the outline of the matching cavities. Under continued temperature and pressure for a total time of approximately 40 seconds, depending upon the size of the button cavities, full curing may be achieved to secure a thermoset, highly durable, laundering resistant button which no longer responds to deformation at temperatures up to carbonization of the charge.

Figure 3:
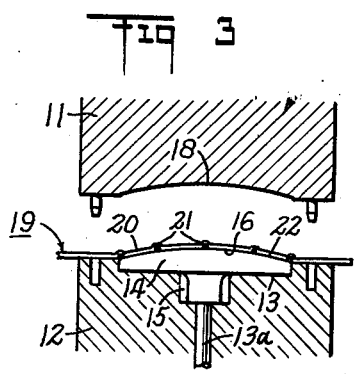

I have discovered, however, that at an intermediate stage at which the mold can be opened without tearing the charge and no spilling occurs at the flash line, and the button has been initially cured beyond the plastic stage, and when none sticks to one meeting cavity so that the mold may be opened while retaining the initially molded charge in the lower cavity section 12, and the highly glazed apearance resulting from having undergone fusion is evident, the charge is still capable of being deformed by an impressing material which, when added to the same mold cavity of the first molding operation, is not displaced by stiffness of the charge at this intermediate stage.

Where it is desired to emboss and ornament the face of the button with an ornamental surface outline, for example such as the lace shown in FIGURE 1, I may cover the total exposed area, including the flash line, of the lower mold cavity as it is opened at the intermediate stage, as shown in FIGURE 3. The material 19, of particulated outline, as effected by the strands 20, 21 to furnish open work 22, is the design selected for the buttons. A section of the lace fabric 19 is chosen which is of a size to permit ready transverse distribution over the entire exposed section of the mold cavity 12 so that it will lie across the entire surface of the flash line 17 and cover each of the cavities, as exemplified in FIGURE 3. This will add the thickness of the lace to the mold cavity.

Figure 5:
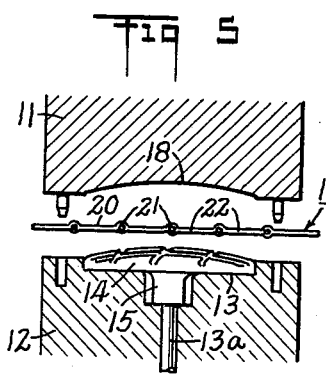

Thereupon the mold sections are again closed promptly and, while retaining the temperatures for curing above described, the mold portions are held together to bring the pressure back to the curing pressure of 3000 pounds per square inch for a period of time sufficient to complete the forty second cure. The mold sections are then partially opened without effecting kick out by the knock out pins 13a, as shown by FIGURE 5, and the fabric 19 is stripped while the residual heat of molding is still present in the buttons. The pressure described has resulted in a faithful reproduction of the outline of the intricate lace, under the added pressure contributed by the lace thickness, on the face of the charge.

The buttons may then be blown out of the cavities by compressed air in the well known manner practiced for discharging the charge, but preferably the mold sections 11 and 12 may be opened wide, to kick out the buttons by means of the knock out pins.

Figure 4:
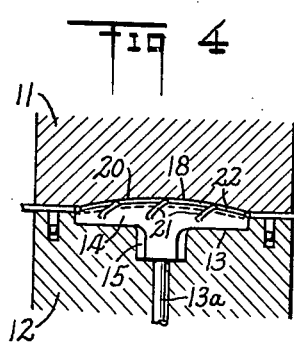

Alternatively, the mold sections, after stripping of the fabric but before final cure has been completely effected, may be closed again and the smooth faced mold section 11 brought to the closing position of the mold, whereupon the heat and pressure for final cure are applied for a period of time to bring the total curing time to forty seconds. The impression made in the operation shown in FIGURES 3 and 4 is not obliterated when the mold sections have been closed and the charge brought to final curing conditions.

Figure 6:
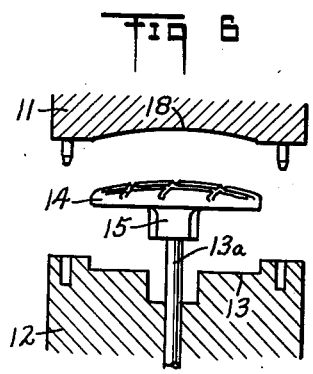
Figure 7:
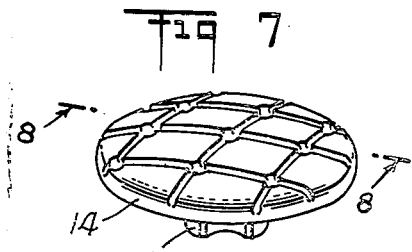
FIGURE 7 is a perspective view of an article made in accordance with the molding operation.

I prefer to omit the second molding step, i.e. closing the mold sections again after stripping of the fabric, as previously described. In such event, the mold sections 11 and 12, after completion of the intermediate curing step, are moved to the partially opened position to position the particulated material or open work fabric 19 as before and the mold sections closed again to effect the embossing and full cure, as previously described, with the fabric in position. The mold sections are then moved to the partially open position and while the charge is still hot and retains the heat of molding, the fabric 19 is stripped from the button faces. The mold sections are then moved to the fully open position shown in FIGURE 6, to effect the pick out of the button charges, and the charged buttons are then removed by scraping, blowing or otherwise, as known in this art.

For inverted positions of mold sections, i.e. with the deep cavities in the upper section, after stripping the fabric 19, a carrier tray may be placed in position beneath the upper mold section and the mold sections are then moved to the fully opened position, where the knock out pins become effective on the upper mold cavities.

Another working example of my invention, although not as preferred, I may, particularly with very heavy open mesh fabric, first cure the charge for a time to effect full or almost full cure, short by 5 to 25 seconds, depending on the size of the charge, without the fabric in position, and move the mold sections to a partially open position. At this latter position, the fabric is placed in position over the button faces, the mold sections closed again to full heat and pressure for five to twenty five seconds, to effect the embossing impression as before. The mold sections are then moved to the partially open position, the fabric stripped while there is present the residual heat of molding but no evidence of tearing. Thereupon the mold sections 11 and 12 are moved to the knock out position to discharge the buttons, as before, the buttons being collected by blowing, scraping or by tray catching if in the inverted position from that shown, i.e. with the deep cavity on the upper mold section.

By this procedure a relatively small run of ornamental buttons may be made in accordance with the number of cavities by each charge of the mold, employing a simple cavity outline and without investment in a costly engraved surface.

The ornamenting material which may be indicated as providing an operative example is lace made of nylon, the threads of which are monofilaments of from .002 to .050" in diameter. Such lace may be used for eight or nine runs without destruction. A variation in diameter of the threads as described may be proportional to a variation in button size of from 13 ligne to 50 ligne. A 20 to 50% open work is recommended.

The monofilament which I have exemplified is preferably formed from nylon, a material which I have found is not thermoplastic. Lacework of fibres which are thermoplastic, such as cellulose acetate filament or yarn, at the temperatures of curing, should be avoided. A wide variety of materials which are not thermoplastic at the curing temperatures may be employed, such as cotton, burlap, rough felt, glass fibre yarns, yarns made of acrylics, panels of wire screening, such as aluminum or copper or iron, the design of which may be found desirable to impress on the buttons.

Material such as table salt and saw dust may also be employed, in which case when the mold is opened at the stage after the initial cure has been effected, as in FIGURE 3, the particles of table salt or saw dust are sprinkled onto the exposed faces of the buttons while in their respective cavities. Thereupon the mold is closed to impress the outline on the charge and heat and pressure applied to effect a full cure. The mold sections are moved to the partially open position and the particles of table salt or saw dust brushed off mechanically, in a manner so as not to dislodge the charge from the underlying mold cavity and while the residual heat of molding is retained. Thereupon the mold sections are moved to the knock out position, to collect the charge so released from the mold.

By reason of the three dimensional and open work factors of the strippable sheet materials which I have described to furnish the decorated impression, I refer to both the sheeted fabric and the particles as "particulated material."

Thus, by a judicious choice of particulated material or particles which are not too abrasive to the die but have sufficient resistance to avoid distortion while imparting their outline to the deformable charge while it is still resilient, designs may be economically impressed upon buttons for short runs, to test out their suitability and commercial acceptance.

In this manner, the unusually heavy cost of etched metal dies is avoided, while still permitting the preparation of buttons having varied designs thereon for little more than the cost of smooth faced buttons by the use of simple dies whose overall simple surface can be used for final cure without distortion of the design after removal of the particulated insert.

While I have described and illustrated melamine, a wide variety of synthetic, thermosetting condensation products may be employed and for this purpose other aminoplasts, such as urea formaldehyde resins, aniline formaldehyde resins may be employed; also the phenoplasts, such as phenol formaldehyde, furfural fomaldehyde condensation products; also the polyesters such as the alkyd resins and unsaturated polyester resins; also the polyethers, such as polyoxymethylenes and epoxy resins, the time, temperature and pressure in each case being variable in accordance with the size and kind of the charge, to effect a total cure, it being necessary to observe that the initial cure is carried out to the point where no further spilling into the flash line progresses while the charge retains sufficient of the temperature to evidence resiliency, has gone beyond the plastic stage, and has been fully formed and is integrated so that none of the material sticks to the separating mold section upon opening of the mold.

Figure 1B:
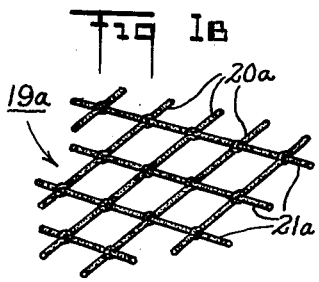
FIGURE 1b illustrates an open weave fabric treated for shadow toning.
Figure 2:
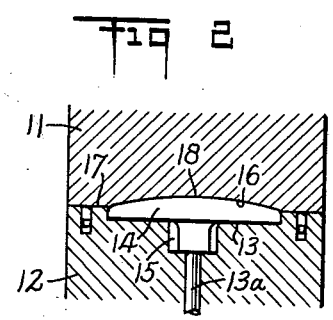
FIGURES 2 to 6 are fragmentary sectional views to illustrate molding steps.

While I have described and illustrated simple impressions of the particulated materials during a partial or intermediate stage, I may impart a two tone or shading element to the embossed portions of the buttons. This may be accomplished to interfuse simultaneously by bleeding a resin lacquer from a carrier which, in this case, is the particulated material. For this purpose, particulated material such as the open work lace 19 as in FIGURE 1 is coated with a pigmented lacquer to provide the lace 19a (FIGURE 1b) with a distribution of lacquer on the strands 20a and 21a thereof. The lacquer is applied by dipping, spraying or brushing the filaments, lengths or particles of the particulated material.

An example of a procedure to produce a two tone effect is as follows:

10 parts by volume of a heat curable lacquer base, for example, epoxy resin, are mixed with 10 parts by volume of a catalyst dissolved in a solvent therefor, and 1 part by weight of a color paste, the color base being a dispersion compatible with resin and which will withstand the high heat treatment of the molding cycle, i.e. umber for brown and red oxide for red.

A quantity of solvent in accordance with the coating method to be employed is then added i.e. a very dilute quantity of the dry ingredients for spraying, and a lesser quantity of the solvent for brushing and dipping.

The particulated material, such as open netting of monofilament nylon is coated, for example by spraying, is air dried for 10 or 15 minutes and is then ready for use. The heat curable, potentially reactive pellet charges are loaded in the mold cavities of a compression mold as described (or an opposed mold section in the inverted position of the mold sections), the mold being provided with means for heating and applying the pressure in accordance with the prior example, depending upon the particular thermosetting resin which is to be processed—in this example, melamine. The mold sections are closed to apply approximately 3000 pounds pressure per square inch at a temperature of 350° F. for 25 to 35 seconds for mold cavities of 15 to 30 ligne buttons.

At approximately the end of this time exposure of curing and when the charge separates from the mold and is glassy in appearance, it is substantially fully cured but, at the molding temperature is still deformable.

The mold sections are then moved to the partially open position and the face side of the buttons to be embossed are covered with open work netting coated with the heat curable resin as described. The mold sections are immediately closed to the full pressure and heating conditions previously described for 5 to 30 seconds. The mold is then partially opened and while the charge retains the heat of molding, the netting is stripped quickly from the face of the buttons molded and the mold sections then moved to the fully open or knock out position.

It is to be understood that in a mold not provided with knock out pins, the entire sheet of netting, including the adherent buttons, is stripped from the mold and immediately passed beneath a stripping knife.

Figure 8A:
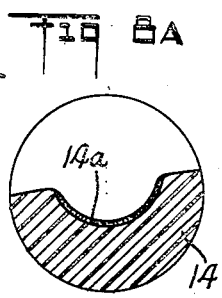
FIGURE 8a is a magnified fragmentary section corresponding to the portion encircled in FIGURE 8, made in accordance with another embodiment of my invention.
Figure 8:
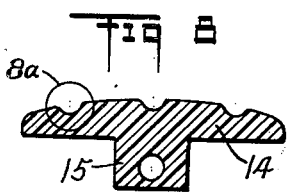
FIGURE 8 is a section taken on the line 8—8 of FIGURE 7.

During the application of the pressure at the temperature described, a transfer or bleeding of the pigmented lacquer base has occurred, to result in having the coating of lacquer on the nylon filaments enter the grooves 14a of the button base and fuse therewith and become cured to the button base (as shown in FIGURE 8a, which is a fragmentary magnification of the matter encircled in the circle 8a, FIGURE 8). A permanence of shade tone is thereby effected, to secure a two tone effect of the button, enhancing the embossed appearance of the finished product without detracting from the launderability or cleanability or wear resistance of the button base.

Variations in working formulations known in the molding art for the particular resinous bases previously exemplified will now readily become apparent, it being noted that the pigmented lacquer base applied to the particulated material, to be introduced into the mold in the uncured stage, is one which is not very compatible with the particulated carrier but is interfusible with the button base composition, to fuse and cure to the thermally infusible stage.

Buttons may be made to simulate colored, leather-covered and embossed buttons of highly attractive nature, by compression molding in multi-cavity molds.

Having thus described my invention and illustrated its use, what I claim as new and desire to secure by Letters Patent is:

1. The method of simultaneously forming a plurality of hard, shaped, surface-decorated articles of synthetic resinous thermo-setting condensation products, which includes the steps of molding in a multiple unit mold under heat and pressure a charge of such resinous material in its potentially reactive stage to form a plurality of individual, shaped units substantially fully cured to the stage wherein the same are separable from the mold parts without tearing but still deformable, exposing a surface of said units, applying over said exposed surface a pliant particulated material readily deformable to conform to the surfaces of the exposed units, reapplying mold pressure to said articles through said material to impress the design of the particulated material onto said exposed surface of said units in a second forming operation, completing the cure of said articles after the same have been impressed, and removing the particulated material from said articles.

2. The method of simultaneously forming a plurality of hard, shaped, surface-decorated articles of synthetic resinous thermo-setting condensation products, which includes the steps of molding in a multiple unit mold under heat and pressure a charge of such resinous material in its potentially reactive stage to form a plurality of individual, shaped units substantially fully cured to the stage wherein the same are highly glazed and are separable from the mold parts without tearing but still deformable, exposing a surface of said units, applying over said exposed surface a pliant particulated fabric readily deformable to conform to the surfaces of the exposed units, reapplying mold pressure to said articles through said fabric to impress the design of the particulated fabric onto said exposed surface of said units in a second forming operation, completing the cure of said articles after the same have been impressed, and removing the particulated fabric from said articles.

3. The method in accordance with claim 2 wherein said fabric constitutes nylon filaments.

4. The method of simultaneously forming a plurality of hard, shaped, surface-decorated articles of synthetic resinous thermo-setting condensation products, which includes the steps of molding in a multiple unit mold under heat and pressure a charge of such resinous material in its potentially reactive stage to form a plurality of individual, shaped units substantially fully cured to the stage wherein the same are separable from said mold parts without tearing but still deformable, exposing a surface of said units, applying over said exposed surface a pliant particulated material readily deformable to conform to the surfaces of the exposed units, said material carrying a heat fusible, pigmented lacquer coating, reapplying mold pressure to said articles through said material to impress the design of the particulated material onto said exposed surface of said units in a second forming operation, and completing the cure of said articles after the same have been impressed, and stripping the material from the shaped articles whereby the articles retain the impressed, pigmented design on said surface.

5. The method in accordance with claim 4 wherein the particulated material comprises absorbent fabric.

References Cited in the file of this patent

UNITED STATES PATENTS

| | | |
|---|---|---|
| 1,978,030 | Ritchie | Oct. 23, 1934 |
| 2,208,494 | Broderson | July 16, 1940 |
| 2,250,958 | Kautter et al. | July 29, 1941 |